UNITED STATES PATENT OFFICE.

JACOB S. ROBESON, OF AU SABLE FORKS, NEW YORK.

PROCESS OF TREATING ROADS, &c.

1,069,030. Specification of Letters Patent. Patented July 29, 1913.

No Drawing. Application filed November 20, 1908, Serial No. 463,710. Renewed September 3, 1912. Serial No. 718,397.

*To all whom it may concern:*

Be it known that I, JACOB S. ROBESON, a citizen of the United States, and a resident of Au Sable Forks, Essex county, New York, have invented an Improved Process of Treating Roads, &c., of which the following is a specification.

The object of my invention is to provide means for preventing or retarding the formation of dust upon roadways, and a further object of my invention is to effect the formation of a road or road surface. Many attempts have been made to accomplish this result, but in the main, while they have tended to improve the surface by keeping the same in a more compact and wear-resisting condition, they have not prevented the formation of dust after the initial application of the surfacing material, nor have they maintained the proper coherence between the surface of the road and the body or bed of the same.

In the manufacture of paper pulp under what is known as the "sulfite process," which consists in boiling wood and other fibers under pressure in a solution containing sulfurous acid and a base (or bases), such as lime or magnesia, (or lime and magnesia), a vast quantity of a watery mixture known as sulfite waste liquor is produced, that hitherto has had little value, besides being highly objectionable in a number of ways and very difficult of disposal. In the patent granted to me October 15, 1906, No. 833,634, a process of treating such waste liquor for the purpose of recovering the greater portion of the colloidal matter, as well as all of the contained resins, gums and other extracted constituents of the woody tissues in a valuable form, is fully described and claimed. In a companion application filed November 20, 1908, Serial No. 463,709, I have described and claimed the use of this material as the means of surfacing or building roads; such material containing the organic constituents of the original sulfite liquor in a substantially unchanged state chemically and retaining all of their properties which I have found to be valuable for the present purpose. In the digestion of the wood by the bisulfite solution, the "lignone" component of the wood goes into solution to form dissolved bodies which are, or are in the nature of, salts of sulfonic acids with the bases (lime or magnesia) and the characteristic sulfur-containing colloid constituents of the liquor are, for the sake of a name, often called "lignosulfonates" in the art. The original thin liquor as it comes from the digester is much less suitable, as it is quite sensitive to atmospheric and other influences, readily decomposing. After concentration in the manner described in the acknowledged patent, however, it loses much of this sensitiveness, even on redilution.

The characteristic dissolved organic matters of sulfite waste liquor may be obtained by suitable methods in combination with sesquioxid bases such as alumina, chromium oxid or ferric oxid; and solutions of such combinations, which I may term "treated liquors" I find useful as a surfacing material for roads, streets, tracks, etc. As ordinarily made, this treated liquor is quite dense. A suitable type of this treated liquor may be prepared, by admixing the concentrated liquor of Patent 833,634 with sufficient concentrated solution of sulfate of alumina to throw down the lime as sulfate and replace it by alumina in the solution. The lime compounds of the colloid organic bodies of the solution become the corresponding alumina compounds.

The treated liquor is preferably diluted with water before use, the amount of dilution before application to the road depending very largely upon the character of the road. If, for instance, it be a macadam road with a hard surface, free from dust, it is advisable to make the mixture relatively thick, say sixty per cent. of the treated liquor and forty per cent. of water. As the amount of dust, that is, finely divided mineral matter, on the road increases, so must the amount of water employed increase, so that upon an ordinary dirt road made of clayey natural soils, the best proportions are twenty-five per cent. of treated liquor and seventy-five per cent. of water.

So far as my present experience has shown, the best results are obtained when the equivalent of about three-tenths of a gallon of the dense treated liquor is applied to one square yard of road surface. The proportions used may range from one-tenth to five-tenths of a gallon of the treated liquor to a square yard of road surface.

On track work, speedways, etc., having a relatively springy body and surface, the method of preparing the surface binding material or applying the same, is somewhat different. In the first application, the mixture should be very thin so as to insure good penetration and the last application should be of a thicker nature so as to make a thicker impregnation in the coating or surface on the top.

There seems to be some physical or chemical reaction between the material of the road's surface and the treated liquor applied to the same, which must be different with the different road surfaces treated, but just what it is I am not prepared to state. Liquids which have tanning effects also affect the physical state of clays, &c.

The treated liquor when applied to the road surface is ordinarily acid, and whether it be on a stone road or a dirt road, this acid condition is augmented by absorption from the air, the rain, the water with which it was mixed, and the acids present in the soil. There may be a slight deposit of sulfate of lime, but the main effects are due to the tanning principle of the concentrated sulfite liquor employed as the raw material for the treated liquor, whether it be tannic acid or not, which has an effect upon the physical character of the soil, making it more plastic and adhesive and, upon drying, hard and stone-like. This may be just as true of a stone road, which always contains finely divided material of an earthy nature, as it is of a dirt road, but naturally, by reason of the greater density and larger size of particles in the stone road's surface, the action upon the latter is slower. The action of the treated liquor in this regard, however, takes place much sooner and progresses more rapidly than is the case with the road surfacing material described in my companion case. The primary noticeable results on a stone road are possibly mainly due to the adhesive character of the treated liquor, but the later effects are due to another action.

I am aware of the use of oil as a means of laying the dust upon roads, and while oil is relatively effective for this purpose, it is not in any sense a road maker, as distinguished from a dust preventive, since it simply damps the dust and keeps it from rising by ordinary liquid adhesion, but does not retain it or cause it to adhere to the rest of the dirt or soil and pack into the road surface properly. It is merely a binder. Nor does it have any chemical or physical effect on the fine mineral matter of the road surface, acting mainly by virtue of its liquidity when first applied though by subsequent evaporation. it frequently leaves a sticky adhesive residuum which acts as an ordinary adhesive, and which in the case of some oils, may be asphaltic in its nature. Though the oil may damp and cause the dusty and heavier particles of the road to adhere more or less to one another, it does not in any way compact or bind them into the road surface or fill the voids of the same, and the wheels of vehicles passing over such damped surface pick up clods of the cohering dust or heavier particles and move them along the road surface. Oils do not have any specific action upon the physical character of soil particles.

The treated liquor which I use as a dust preventer and road builder acts in a manner quite different from oil applied for the same purpose. Aside from its specific action (either chemical or physical, or, perhaps, both) in restraining the formation of loose dusty particles, when first applied, it causes the loose dust particles on the road surface to cohere and remain in the position where they were caught by the liquid applied. Any passing load, as of a wheel or a roller, while these particles are initially damp or at any time when they may have become damp at some later period by reason of dew or rain, forces them into the crevices of the road surface and places them back where they originally belonged or puts them into the voids caused by friction and makes them act again as they did when the road surface was absolutely new, viz., as binders between the stones forming the surface and body of the road, thus completing the arch and insuring its solidity.

When the applied treated liquor strikes a road surface that is relatively free from dust it penetrates the same to a greater or less degree and by reason of its adhesive action holds the finer particles in their proper places, as well as changing their nature in some manner so as to form dense compact masses. When dust is later formed by friction and the road surface becomes damp, it retains this dust and enables it to be packed into the voids that form from time to time. While this result is perhaps more true with reference to a stone road surface, it will be readily understood that the same thing, in a slightly different form, perhaps, is true of a dirt or loose road surface, and my experience has shown that a loose road surface coated, sprinkled or otherwise dressed with the treated liquor finally becomes hard, dense and solid. The original thin liquor as it comes from the digester is much less suitable for forming the compound with the sesquioxid base, as it is quite sensitive to atmospheric and other influences, readily decomposing. After concentration in the manner described in the acknowledged patent, however, the waste sulfite liquor loses much of this sensitiveness, even on redilution.

From the foregoing it will be evident that the compound of the organic constituents of concentrated sulfite liquor with a sesquioxid is a highly valuable material as a road-maker, and by reason of this value and the fact that it is of such a nature as to extract moisture from the atmosphere it acts as a perfect dust-retarder. While not sufficiently hygroscopic to form mud, it is hygroscopic to a sufficient degree to remain somewhat damp.

In view of the fact that the treated liquor is soluble in water, it would be reasonable to expect some loss due to heavy rains in a road treated according to the present process. In practice, however, a road seems to stand considerable wetting before the material loses its virtue of cohering the particles of dirt and dust forming the top surface of the road. With a view, however, of obviating any tendency of the treated liquor to wash out under the influence of heavy rains, I may coat, sprinkle or otherwise dress, the road prepared with the treated liquor with a thin film or surface coating of oil. This is best accomplished by spreading the same upon the road with compressed air after the treated liquor has been applied, and the most permanent results can be obtained with the use of a drying oil. Any of the common oils may be employed as an oily surfacing material, however, and petroleum is not only suitable but preferable on account of its relative cheapness. This petroleum may have an asphalt base, either naturally, as in the case of California and some Texas oils, or artificially added, as in the case of mixtures of asphalt with Pennsylvania and like oils to give it drying properties.

There are a number of ways of constructing a road with the use of the treated liquor. For instance a road of the ordinary character as to the sub-grade may have upon the top a layer, approximately six inches of thickness, of mineral road material mixed with treated liquor in the proportion of about three (3) to eight (8) gallons of treated liquor to the cubic yard. The treated liquor may also be mixed with earth, powdered rock, gravel and other road building materials in this and other proportions. So far as proportions of material go, it is certain that better and more lasting results will be attained with the treated liquor in relatively large amounts. Commercially, however, the proportions for the different roads must be determined by experiment as it is certain that hard roads, such as Telford and macadam consisting mainly of comparatively large fragments of stone or the like and having relatively small proportions of finely divided earthy mineral matter, do not require so much as soft dirt roads, and on the other hand tracks, speedways, etc., require a method of treatment entirely different from either hard or soft dirt roads.

The compound of concentrated sulfite waste liquor with alumina or other basic sesquioxid of the character described has a peculiar action upon finely powdered mineral matter of a clayey or earthy nature, such as forms the surface of all ordinary unpaved roadways, changing its character in some manner so that it does not dust freely but becomes hard and compact on drying. As to the nature of this action I am at present unaware, and it may be either chemical or physical, or, more probably, both; the action upon clay (which forms a component of practically all earthy road surfaces) being perhaps similar to that which tannin exercises, the colloid matters of the sulfite waste liquor resembling tannin in many other respects.

I claim:

1. The method of forming hard and permanent road surfaces on roads formed of or comprising finely divided earthy material which comprises treating the same with a solution comprising organic matters of concentrated waste sulfite liquor in combination with a sesquioxid.

2. The method of forming hard and permanent road surfaces on roads formed of or comprising finely divided earthy material which comprises treating the same with a solution comprising organic matters of concentrated waste sulfite liquid in combination with alumina.

3. A road containing earthy matter and a combination of organic matters of waste sulfite liquor with a sesquioxid.

4. A road containing earthy matter and a combination of organic matters of waste sulfite liquor with alumina.

5. The method of forming hard and compact road surfaces on roads formed of or comprising finely divided earthy material which comprises applying to such a road an aqueous liquid comprising a dissolved salt of alumina with the acid constituents of sulfite waste liquor.

6. In the production of a hard, compact and permanent roadway the method which comprises incorporating with road materials comprising clay or clay-yielding materials a composition comprising the characteristic sulfur containing organic matters of a concentrated sulfite waste liquor, said organic matters being in a substantially undecomposed condition and in combination with a sesquioxid base.

7. The process of making roads which comprises treating a road surface containing clayey matter with a concentrated waste sulfite liquor preparation containing a sesquioxid base and thereafter applying oil.

8. The process of making roads which comprises treating a road surface containing clayey matter with a concentrated waste sulfite liquor preparation containing a sesquioxid base and in a diluted condition and thereafter applying oil.

9. The process of making roads which comprises treating a road surface containing clayey matter with a concentrated waste sulfite liquor preparation containing a sesquioxid base and thereafter applying oil containing an asphaltic base.

10. As a new article of manufacture, a roadway containing clayey matter having its surface particles impregnated with, altered by and united by a concentrated waste sulfite liquor preparation containing a sesquioxid base, and having an oil seal for said altered and united particles.

In testimony whereof, I have signed my name to this specification, in the presence of two subscribing witnesses.

JACOB S. ROBESON.

Witnesses:
  F. J. PINE,
  ROBERT CALDWELL.